(12) United States Patent
Grace et al.

(10) Patent No.: US 11,804,133 B2
(45) Date of Patent: Oct. 31, 2023

(54) HIGHLY LOCALIZED WEATHER DATA RECORDED BY VEHICLES IN A FLEET

(71) Applicant: GM Cruise Holdings LLC, San Francisco, CA (US)

(72) Inventors: Nestor Grace, San Francisco, CA (US); Diego Plascencia-Vega, San Francisco, CA (US); Spyros Maniatopoulos, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 74 days.

(21) Appl. No.: 17/556,849

(22) Filed: Dec. 20, 2021

(65) Prior Publication Data

US 2022/0114891 A1   Apr. 14, 2022

Related U.S. Application Data

(63) Continuation of application No. 16/582,683, filed on Sep. 25, 2019, now Pat. No. 11,250,703.

(51) Int. Cl.
| | |
|---|---|
| *G08G 1/0967* | (2006.01) |
| *G01C 21/36* | (2006.01) |
| *G07C 5/00* | (2006.01) |
| *G08G 1/00* | (2006.01) |

(52) U.S. Cl.
CPC ... *G08G 1/096791* (2013.01); *G01C 21/3691* (2013.01); *G07C 5/008* (2013.01); *G08G 1/20* (2013.01)

(58) Field of Classification Search
CPC .. G08G 1/096791; G08G 1/20; G08G 1/0129; G08G 1/0141; G08G 1/096725; G08G 1/096741; G08G 1/096775; G08G 1/207; G08G 1/0112; G01C 21/3691; G07C 5/008; H04W 4/02; H04W 4/44
USPC ......................................................... 701/117
See application file for complete search history.

(56) References Cited

U.S. PATENT DOCUMENTS

| | | | |
|---|---|---|---|
| 11,250,703 B2 * | 2/2022 | Grace | G08G 1/096725 |
| 2003/0023466 A1 | 1/2003 | Harper | |
| 2007/0027593 A1 | 2/2007 | Shah et al. | |
| 2010/0036560 A1 * | 2/2010 | Wright | B60R 16/037 701/36 |
| 2011/0298638 A1 * | 12/2011 | Groeneweg | G08G 1/20 340/905 |
| 2015/0166072 A1 * | 6/2015 | Powers | G08G 1/015 701/1 |
| 2017/0236052 A1 | 8/2017 | Israelsson et al. | |
| 2018/0198846 A1 * | 7/2018 | Srinivasan | H04L 63/0428 |
| 2019/0047584 A1 * | 2/2019 | Donnelly | B60W 30/025 |
| 2021/0090436 A1 | 3/2021 | Grace et al. | |

* cited by examiner

*Primary Examiner* — Tyler D Paige
(74) *Attorney, Agent, or Firm* — Novak Druce Carroll LLP

(57) ABSTRACT

The present technology utilizes vehicles in a fleet of vehicles to record weather data samples at many locations in a service area. Each vehicle in the fleet becomes a weather station that can record weather data at many locations and frequently. The weather data can be used to make intelligent decisions regarding fleet management.

20 Claims, 3 Drawing Sheets

HIGHLY LOCALIZED WEATHER DATA RECORDED BY VEHICLES IN A FLEET

CROSS-REFERENCE TO RELATED APPLICATIONS

This application is a continuation of U.S. application Ser. No. 16/582,683, filed on Sep. 25, 2019, entitled, HIGHLY LOCALIZED WEATHER DATA RECORDED BY VEHICLES IN A FLEET, which is hereby expressly incorporated herein by reference in its entirety.

TECHNICAL FIELD

The present technology pertains to obtaining highly localized weather data, and more specifically pertains to obtaining highly localized weather data from vehicles in a fleet of vehicles and using the highly localized weather data for fleet management.

BACKGROUND

An autonomous vehicle is a motorized vehicle that can navigate without a human driver. An exemplary autonomous vehicle includes a plurality of sensor systems, such as, but not limited to, a camera sensor system, a lidar sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

Weather services typically make use of weather satellites or instruments fixed to a location on the ground. Most weather services provide predictions and measurements for a region. However, some weather services can predict or record weather readings for a town or even a neighborhood of a city.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
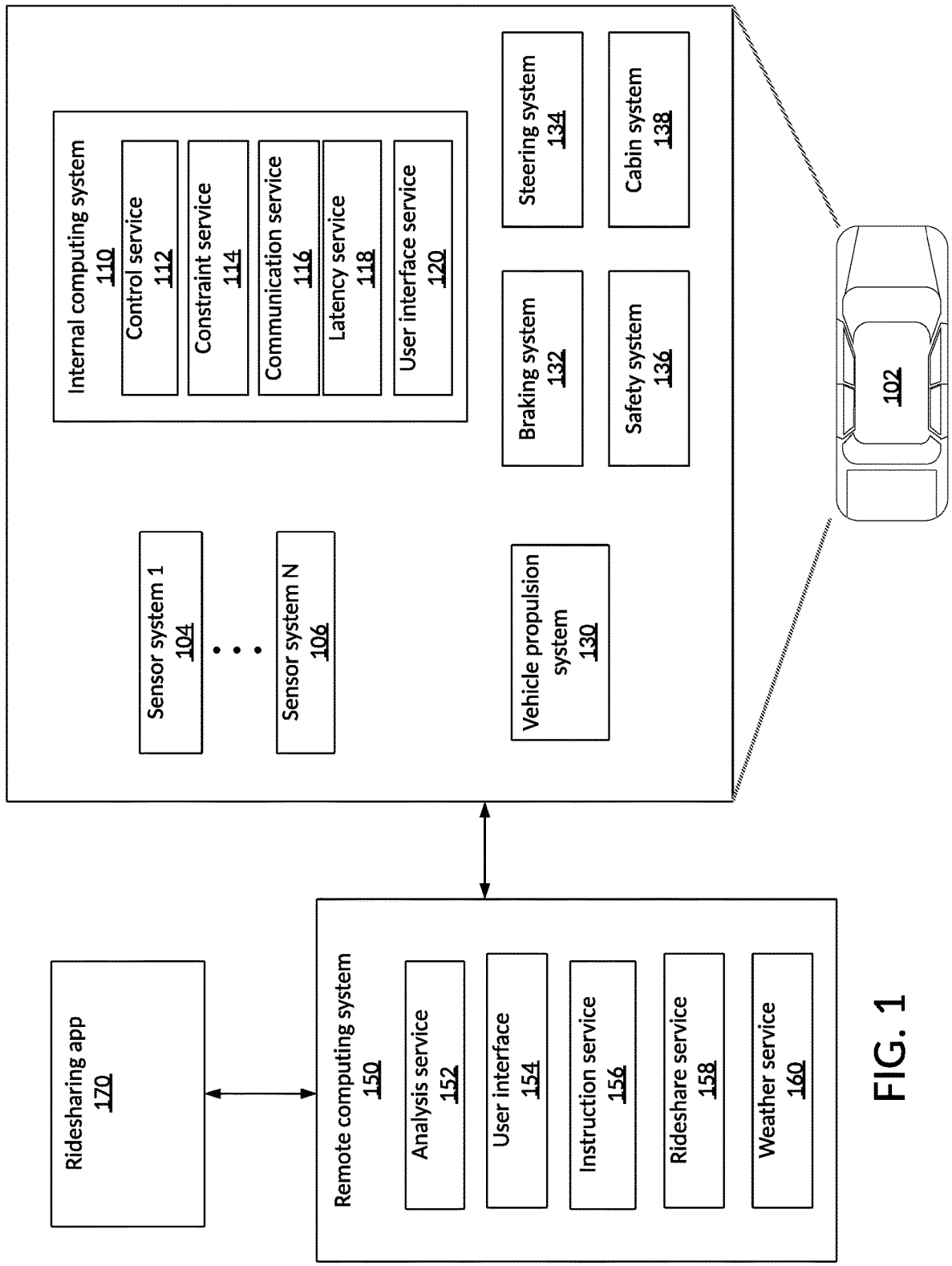
FIG. 1 shows an example of an autonomous vehicle and remote computing system in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technology addresses the need in the art for weather data at a higher level of granularity than is currently available. Weather services currently predict and record weather at regional or neighborhood levels of granularity. However, in some places, the weather can be very different just a short distance away and the weather can change rapidly. For example, occasionally a single cloud can pour rain down on a small area on an otherwise sunny day.

Very localized weather readings and predictions can be important when managing a fleet of vehicles. Depending on the weather condition, vehicles might need to be routed to avoid certain types of weather, or vehicles might need to change driving characteristics such as speed, acceleration or deceleration profiles, torque vectoring, ABS (antilock braking system) performance based on road resistance, and overall detectability and visibility to compensate for weather. For example, fog, wet roads, and ice are just a few conditions that can make driving significantly less safe. In the case of autonomous vehicles, some weather conditions might significantly impair one or more sensors, which may make the autonomous vehicle unable to safely pilot itself.

One reason why weather services localized to the level of the present technology (localized to weather readings of every 1000 meters or 500 meters, for example) do not currently exist is that weather measurement equipment can be expensive and requires a place to install it. However, the present technology overcomes this limitation by installing these sensors on vehicles in a fleet of vehicles. In some embodiments, such as embodiments utilizing autonomous vehicles, the vehicles already have many of the sensors required. For example, an autonomous vehicle includes a radar sensor, a camera, a thermometer, a humidity sensor, a rain sensor, and a LIDAR sensor among other sensors that can be used to measure weather conditions.

Since the vehicles in the fleet will traverse an entire city or larger area, it is possible to obtain measurements from the vehicles in the fleet at many locations in the area that they service. In this way, the present technology can obtain weather data from many locations with less equipment than if weather equipment were permanently installed throughout an area.

FIG. 1 illustrates environment 100 that includes an autonomous vehicle 102 in communication with a computing system 150. While FIG. 1 illustrates an autonomous vehicle, it will be appreciated that the present technology is not limited to an autonomous vehicle. Any vehicle with the necessary sensors in a fleet of vehicles that serves any purpose is sufficient to carry out the present technology.

The autonomous vehicle 102 can navigate about roadways without a human driver based upon sensor signals output by sensor systems 104-106 of the autonomous vehicle 102. The autonomous vehicle 102 includes a plurality of sensor systems 104-106 (a first sensor system 102 through an Nth sensor system 104). The sensor systems 104-106 are of different types and are arranged about the autonomous vehicle 102. For example, the first sensor system 104 may be a camera sensor system and the Nth sensor system 106 may be a lidar sensor system. Other exemplary sensor systems include radar sensor systems, global positioning system (GPS) sensor systems, inertial measurement units (IMU), infrared sensor systems, laser sensor systems, sonar sensor systems, thermal cameras, and the like. Some sensors can be weather sensors such as humidity sensors, temperature sensors, air quality sensors, air pressure sensors, windspeed sensors, altimeter sensors, road surface measurement systems, etc.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during driving.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 104-106 and the mechanical systems 130, 132, 134. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control operation of the vehicle propulsion system 206, the braking system 208, the steering system 210, the safety system 136, and the cabin system 138. The control service 112 receives sensor signals from the sensor systems 202-204 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 116 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112

The internal computing system 110 can also include a communication service 116. The communication service can include both software and hardware elements for transmitting and receiving signals from/to the remote computing system 250. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system, software service updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 140 regarding reporting data for training and evaluating machine learning algorithms, requesting assistance from remoting computing system or a human operator via the remote computing system 150, software service updates, ridesharing pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

Figure 2:
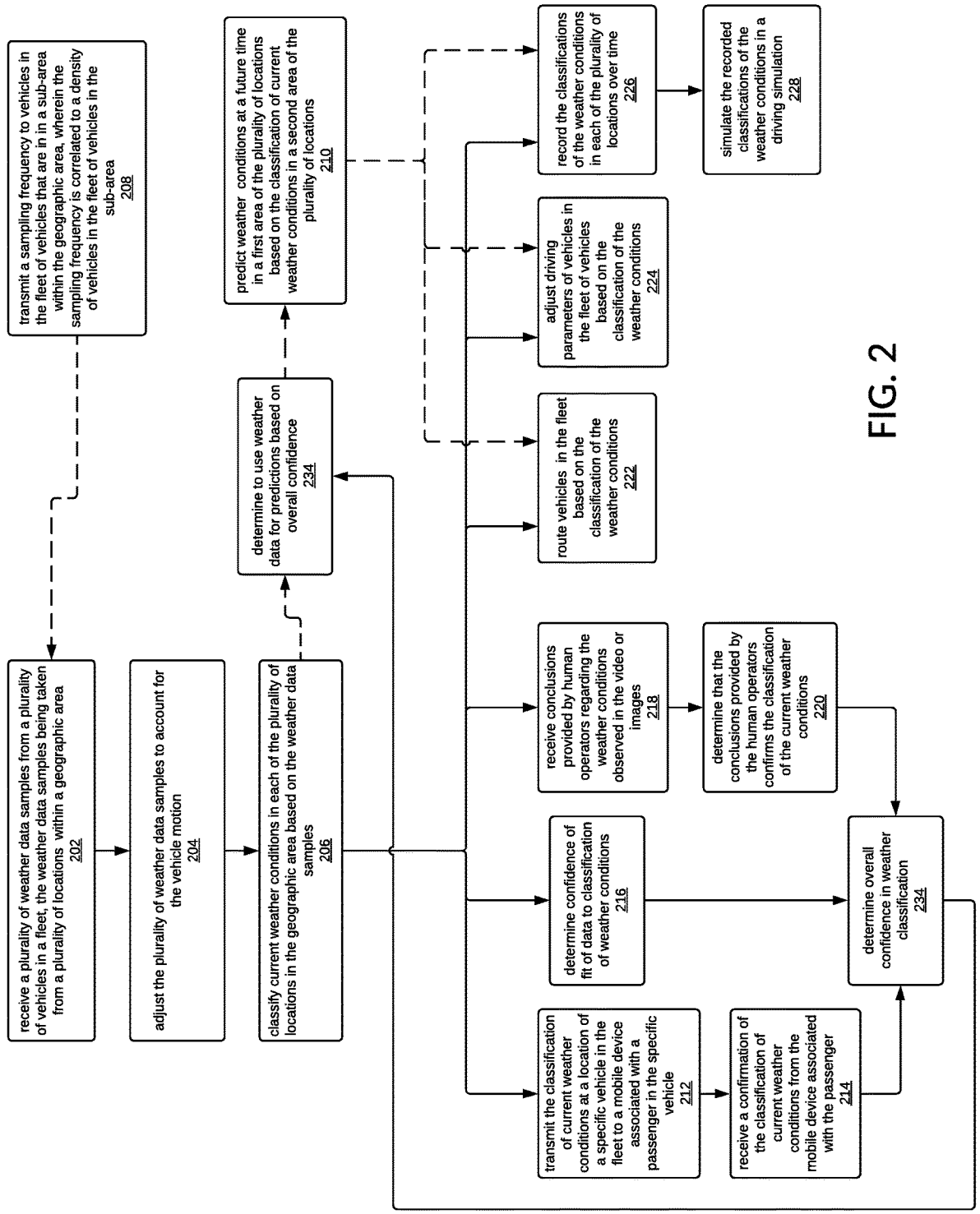
FIG. 2 shows an example method embodiment in accordance with some aspects of the present technology.

FIG. 2 illustrates an example method for receiving and utilizing weather data samples from a plurality of vehicles in a fleet.

As noted above vehicles in a fleet of vehicles can be configured with a variety of sensors that can be used to record data describing observed atmospheric and weather conditions. Some of these sensors may be primarily used for other purposes such as allowing an autonomous vehicle to navigate, while some sensors may be specific to weather and atmospheric measurement applications.

As vehicles 102 in the fleet of vehicles traverse a service area as part of their normal duties (rideshare duties, delivery duties, municipality infrastructure maintenance, agricultural assistance etc.) vehicles 102 can utilize their sensors 104-106 to record weather data and can send the data to weather service 160 at remote computing system 150. Weather service 160 can receive (202) a plurality of weather data samples from a plurality of vehicles 102 in a fleet.

The weather data samples can be taken from a plurality of locations within a geographic area. In some embodiments, the locations can be defined points within the geographic area, while in some embodiments locations can be any recorded location where vehicle 102 recorded weather data. The geographic area can be any area in which the fleet of vehicles service. Therefore, the geographic area can be a neighborhood, a municipality, a state, a region, etc.

In some embodiments vehicle 102 can report weather samples continuously over a period of time and over distance. Thus, vehicle 102 is not limited to a particular reporting time or distance interval.

Vehicle 102 knows its current location and can associate its current location with the weather data samples. For example, vehicle 102 can know its location through a combination of GPS coordinates, LIDAR data, and camera data to localize itself on a high density LIDAR map of the geographic area.

Vehicle 102 can also send vehicle motion information to weather service 160. Weather service 160 can use the vehicle motion information to adjust (204) the weather data samples to account for vehicle motion. For example, data regarding wind speed data, wind direction data, pressure data, temperature data, and humidity data will be distorted from a vehicle that is moving. However, with accurate data regarding the speed and the direction vehicle 102 is moving weather service 160 can calculate more accurate values for wind speed and wind direction at the location the measurement was taken. The adjustment (204) is not limited to only adjustments for wind related data. There may be other measurements that need to be adjusted to account for vehicle 102's motion.

Using the data received from vehicle 102, weather service 160 can classify (206) current weather conditions in each of the plurality of locations in the geographic area based on the weather data samples. In some embodiments, weather service 160 can utilize an algorithm, in some embodiments a machine learned algorithm, to ingest weather data samples from vehicles 102 pertaining to a particular location and based on the weather data samples, and can use the data to classify it into current conditions. For example, weather service 160 can classify the current weather as raining when the humidity in the air is sufficiently high or the temperature has fallen below a calculated dew point.

Once weather service 160 has interpreted and classified (206) data samples for a particular location to meaningful weather classifications, weather service 160 can use a variety of means to gain confidence that its weather classification (206) is correct.

In some embodiments weather service 160 can transmit (212) the classification (206) of current weather conditions at a location to a passenger device for a passenger that is in a specific vehicle in the fleet that is at location experiencing those current weather conditions. The transmission can request that the passenger confirm the classification (206) of the current weather conditions at the location. Weather service 160 can then receive (214) a confirmation or contradiction of the classification of the current weather conditions from the mobile device of the passenger. The response from the mobile device associated with the passenger can be used by weather service 160 to determine (234) confidence in its classification of weather predictions. Additionally, the response from the mobile device can be used to further train any machine trained classification model applied in step 206.

In some embodiments, weather service 160 can rely upon feedback from vehicle 102 to determine whether the classification (206) of the current weather conditions a particular location is correct. Weather service 160 can receive operational data from vehicle 102 that is reported to be at the particular location. Weather service 160 can determine (216) that the operational data statistically fits the classification (206) made by weather service 160. For example, if weather service 160 classifies (206) the current conditions at a particular location as raining, but the operational data from vehicle 102 indicates wheel traction of dry pavement or that windshield wipers are not engaged this may contradict the classification made by weather service 160. This information can be utilized by weather service 160 to determine (234) an overall confidence in its weather classification. Additionally, this information can be used to further train any machine trained classification model applied in step 206.

In some embodiments, weather service 160 can receive (218) conclusions provided by human operators regarding weather conditions experienced by vehicle 102. In some embodiments, such as when vehicle 102 is operated by a human operator that is present in the vehicle or remote from the vehicle, the human operator can report back on weather conditions observed. In some embodiments, such as when vehicle 102 is the autonomous vehicle, the human operator may be remote from the vehicle but can access video feeds from the vehicle and can observe visual weather conditions in the video or images. Weather service 160 can determine (220) that the conclusions provided by the human operators confirms or contradicts the classification (206) of the current weather conditions at that location. This information can be used by weather service 160 to determine (234) confidence in its classification of weather predictions. Additionally, this information can be used to further train any machine trained classification model applied in step 206.

The classifications (206) provided by weather service 160 can be used by remote computing system 150 to enhance performance of the fleet of vehicles 102. When weather service determines that its prediction is likely correct based on confidence score (234), remote computing system 150 can use information from weather service 160 to route (222)

vehicles 102 in the fleet. For example, if a fleet of vehicles 102 cannot drive on icy roads—whether as a physical limitation or a risk limitation—remote computing system 150 can avoid areas that are presently icy. Rather than shut down the entire fleet, it may be possible to avoid icy areas. Maybe it is early in the morning, and some bridges have ice on them. The entire fleet does not have to be shut down. Instead, remote computing system 160 can only accept jobs where the fleet can be routed around the icy spots until the icy condition no longer exists as the day progresses and warms up. In examples where vehicle 102 is an autonomous vehicle. There may be many other conditions in which remote computing system 150 would need to or would prefer to take routes that avoid certain weather conditions.

In addition to avoiding areas experiencing certain weather conditions, remote computing system 150 can utilize the classifications (206) provided by weather service 160 to adjust (224) driving parameters of vehicles in the fleet. For example, a fleet of autonomous vehicles 102 may utilize different driving and breaking parameters when roads are wet or icy. Therefore, when one of the autonomous vehicles 102 is planned to drive into an area that is currently experiencing wet conditions on its roads, remote computing system 150 can send new driving parameters to the autonomous vehicle so that it is prepared for the transition to wet pavement.

In some embodiments, remote computer system 150 can route vehicles to areas where weather service 160 has incomplete or not enough data.

Additionally, another benefit of having weather information for so many different locations and for sampling weather data so frequently is that more realistic weather conditions can be modeled and used in simulations to train and test the performance of a fleet of vehicles. As such, weather service 160 can record (226) the classifications of weather conditions in each of the plurality of locations at many times. The recorded (226) classifications of weather conditions can be used to simulate (228) recorded classifications of weather conditions in a driving simulation.

The present technology can also be used to predict weather conditions. By recording weather conditions at such high granularity (meaning so many locations at such frequent intervals) and recording how weather patterns change in an area over time, it can be observed how weather in some conditions moves throughout an area. For example, when fog is first observed in a first area it may be possible to conclude that fog will likely reach a second area after a particular period of time. The machine learning algorithm can be used to analyze how weather conditions throughout all locations in an area change over time. Machine learning algorithms may be used to observe that for certain weather conditions at the weather is likely to spread or evolve in a predictable way. As such weather service 160 can predict (210) weather conditions at a future time in a first area based on the classification of current weather conditions in the second area.

The predicted (210) weather conditions can further be used to route (222) vehicles in the fleet, adjust (224) driving parameters of vehicles in the fleet, and/or simulate (228) weather conditions in a driving simulation.

In some embodiments it can be useful to control a sampling rate of vehicles in the fleet so as to receive the appropriate amount of weather data samples. In some embodiments, certain areas may receive a greater volume of traffic from the fleet of vehicles than others. In such embodiments valuable resources may be saved by adjusting a sampling frequency for vehicles in a particular location. For example, weather service 160 can transmit (208) a sampling frequency to vehicles in the fleet that are in a sub-area within the geographic area that has a greater than average or lower than average number of vehicles in the fleet in the sub-area.

In addition to the above discussed benefits to the fleet of vehicles, the present technology can be useful to provide helpful weather insights to passengers when the fleet of vehicles is used for a car sharing service. For example, ridesharing app 170 can notify a user of the ridesharing service that it is likely to rain later today and that they may want to be prepared.

Additionally, the highly localized weather data can be made available to third parties through a public or private API (application programming interface).

Figure 3:
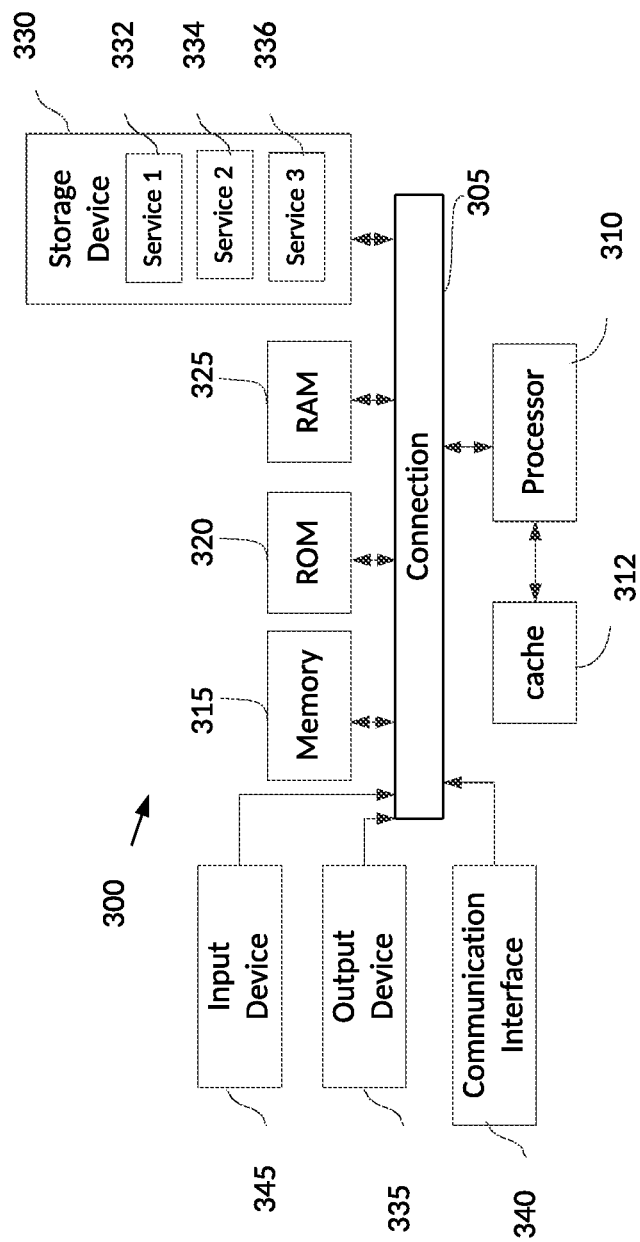
FIG. 3 shows an example of a system for implementing certain aspects of the present technology.

FIG. 3 shows an example of computing system 300, which can be for example any computing device making up internal computing system 110, remote computing system 150, (potential) passenger device executing rideshare app 170, or any component thereof in which the components of the system are in communication with each other using connection 305. Connection 305 can be a physical connection via a bus, or a direct connection into processor 310, such as in a chipset architecture. Connection 305 can also be a virtual connection, networked connection, or logical connection.

In some embodiments, computing system 300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 300 includes at least one processing unit (CPU or processor) 310 and connection 305 that couple various system components including system memory 315, such as read-only memory (ROM) 320 and random access memory (RAM) 325 to processor 310. Computing system 300 can include a cache of high-speed memory 312 connected directly with, in close proximity to, or integrated as part of processor 310.

Processor 310 can include any general purpose processor and a hardware service or software service, such as services 332, 334, and 336 stored in storage device 330, configured to control processor 310 as well as a special-purpose processor where software instructions are incorporated into the actual processor design. Processor 310 may essentially be a completely self-contained computing system, containing multiple cores or processors, a bus, memory controller, cache, etc. A multi-core processor may be symmetric or asymmetric.

To enable user interaction, computing system 300 includes an input device 345, which can represent any number of input mechanisms, such as a microphone for speech, a touch-sensitive screen for gesture or graphical input, keyboard, mouse, motion input, speech, etc. Computing system 300 can also include output device 335, which can be one or more of a number of output mechanisms known to those of skill in the art. In some instances, multimodal systems can enable a user to provide multiple types of input/output to communicate with computing system 300. Computing system 300 can include communications interface 340, which can generally govern and manage the user input and system output. There is no restriction on operating on any particular hardware arrangement, and therefore the basic features here may easily be substituted for improved hardware or firmware arrangements as they are developed.

Storage device 330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 330 can include software services, servers, services, etc., that when the code that defines such software is executed by the processor 310, it causes the system to perform a function. In some embodiments, a hardware service that performs a particular function can include the software component stored in a computer-readable medium in connection with the necessary hardware components, such as processor 310, connection 305, output device 335, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A non-transitory computer readable medium comprising instructions, the instructions, when executed by a computing system, cause the computing system to:
   receive a plurality of weather data samples from a plurality of vehicles in a fleet, the weather data samples taken from a plurality of locations within a geographic area with one or more sensors of the plurality of vehicles comprising at least one of a thermometer, a humidity sensor, an air quality sensor, an air pressure sensor, a windspeed sensor, and an altimeter sensor;
   classify current weather conditions in each of the plurality of locations in the geographic area based on the weather data samples;
   determine a confidence score of the classification of the current weather conditions based on at least one of input from a mobile device associated with a passenger of the plurality of vehicles in the fleet, operational data provided by the plurality of vehicles in the fleet, and input from a human operator associated with the plurality of vehicles in the fleet, wherein the confidence score of the classification determines an overall certainty in the classification of the current weather conditions; and
   in response to a determination that the confidence score satisfies a reliability of the classification of the current weather conditions, adjust at least one driving parameter for at least one vehicle from among the plurality of vehicles in the fleet based on the classification of the weather conditions, wherein a planned route of the at least one vehicle from among the plurality of vehicles comprises at least one location of the plurality of locations within the geographic area and the at least one driving parameter controls a deceleration or a direction of movement of the at least one vehicle from among the plurality of vehicles.

2. The non-transitory computer readable medium of claim 1, wherein the at least one driving parameter comprises a braking parameter, a driving parameter, or a combination thereof.

3. The non-transitory computer readable medium of claim 1, wherein the instructions, when executed by a computing system, cause the computing system to:

calculate a route for the at least one vehicle based on the current weather conditions.

4. The non-transitory computer readable medium of claim 1, wherein the instructions, when executed by a computing system, cause the computing system to:
predict weather conditions for one or more of the plurality of locations at a future time based on the current weather conditions.

5. The non-transitory computer readable medium of claim 1, wherein the instructions, when executed by a computing system, cause the computing system to:
transmit the classification of current weather conditions to a mobile device associated with a passenger; and
receive a confirmation of the classification of current weather conditions from the mobile device associated with the passenger.

6. The non-transitory computer readable medium of claim 1, wherein the plurality of weather data samples comprises one or more measurements taken using a thermometer, a humidity sensor, a rain sensor, or a combination thereof.

7. The non-transitory computer readable medium of claim 1, wherein the fleet comprises one or more autonomous vehicle (AV).

8. A computer-implemented method for classifying weather conditions, the method comprising:
receiving a plurality of weather data samples from a plurality of vehicles in a fleet, the weather data samples taken from a plurality of locations within a geographic area with one or more sensors of the plurality of vehicles comprising at least one of a thermometer, a humidity sensor, an air quality sensor, an air pressure sensor, a windspeed sensor, and an altimeter sensor;
classifying current weather conditions in each of the plurality of locations in the geographic area based on the weather data samples;
determining a confidence score of the classification of the current weather conditions based on at least one of input from a mobile device associated with a passenger of the plurality of vehicles in the fleet, operational data provided by the plurality of vehicles in the fleet, and input from a human operator associated with the plurality of vehicles in the fleet, wherein the confidence score of the classification determines an overall certainty in the classification of the current weather conditions; and
in response to a determination that the confidence score satisfies a reliability of the classification of the current weather conditions, adjusting at least one driving parameter for at least one vehicle from among the plurality of vehicles in the fleet based on the classification of the weather conditions, wherein a planned route of the at least one vehicle from among the plurality of vehicles comprises at least one location of the plurality of locations within the geographic area and the at least one driving parameter controls a deceleration or a direction of movement of the at least one vehicle from among the plurality of vehicles.

9. The computer-implemented method of claim 8, wherein the at least one driving parameter comprises a braking parameter, a driving parameter, or a combination thereof.

10. The computer-implemented method of claim 8, further comprising:
calculating a route for the at least one vehicle based on the current weather conditions.

11. The computer-implemented method of claim 8, further comprising:
predicting weather conditions for one or more of the plurality of locations at a future time based on the current weather conditions.

12. The computer-implemented method of claim 8, further comprising:
transmitting the classification of current weather conditions to a mobile device associated with a passenger; and
receiving a confirmation of the classification of current weather conditions from the mobile device associated with the passenger.

13. The computer-implemented method of claim 8, wherein the plurality of weather data samples comprises one or more measurements taken using a thermometer, a humidity sensor, a rain sensor, or a combination thereof.

14. The computer-implemented method of claim 8, wherein the fleet comprises one or more autonomous vehicle (AV).

15. A system for classifying weather conditions, comprising:
at least one memory; and
at least one processor coupled to the at least one memory, the at least one processor configured to:
receive a plurality of weather data samples from a plurality of vehicles in a fleet, the weather data samples taken from a plurality of locations within a geographic area with one or more sensors of the plurality of vehicles comprising at least one of a thermometer, a humidity sensor, an air quality sensor, an air pressure sensor, a windspeed sensor, and an altimeter sensor;
classify current weather conditions in each of the plurality of locations in the geographic area based on the weather data samples;
determine a confidence score of the classification of the current weather conditions based on at least one of input from a mobile device associated with a passenger of the plurality of vehicles in the fleet, operational data provided by the plurality of vehicles in the fleet, and input from a human operator associated with the plurality of vehicles in the fleet, wherein the confidence score of the classification determines an overall certainty in the classification of the current weather conditions; and
in response to a determination that the confidence score satisfies a reliability of the classification of the current weather conditions, adjust at least one driving parameter for at least one vehicle from among the plurality of vehicles in the fleet based on the classification of the weather conditions, wherein a planned route of the at least one vehicle from among the plurality of vehicles comprises at least one location of the plurality of locations within the geographic area and the at least one driving parameter controls a deceleration or a direction of movement of the at least one vehicle from among the plurality of vehicles.

16. The system of claim 15, wherein the at least one driving parameter comprises a braking parameter, a driving parameter, or a combination thereof.

17. The system of claim 15, wherein the at least one processor is further configured to:
calculate a route for the at least one vehicle based on the current weather conditions.

18. The system of claim 15, wherein the at least one processor is further configured to:

predict weather conditions for one or more of the plurality of locations at a future time based on the current weather conditions.

19. The system of claim 15, wherein the at least one processor is further configured to:
   transmit the classification of current weather conditions to a mobile device associated with a passenger; and
   receive a confirmation of the classification of current weather conditions from the mobile device associated with the passenger.

20. The system of claim 15, wherein the plurality of weather data samples comprises one or more measurements taken using a thermometer, a humidity sensor, a rain sensor, or a combination thereof.

* * * * *